Dec. 31, 1957　　　A. J. HOVDE　　　2,818,055
INTERNAL COMBUSTION ENGINE
Filed July 30, 1954　　　2 Sheets-Sheet 1

Inventor
Arne J. Hovde
By J. C. Thorpe
Attorney

Dec. 31, 1957  A. J. HOVDE  2,818,055
INTERNAL COMBUSTION ENGINE
Filed July 30, 1954  2 Sheets-Sheet 2
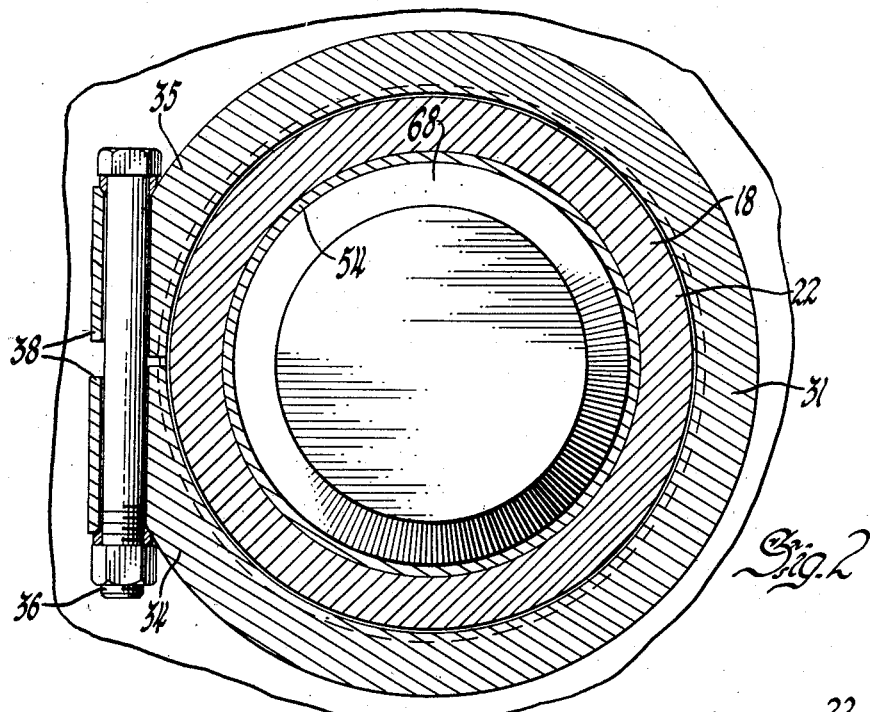
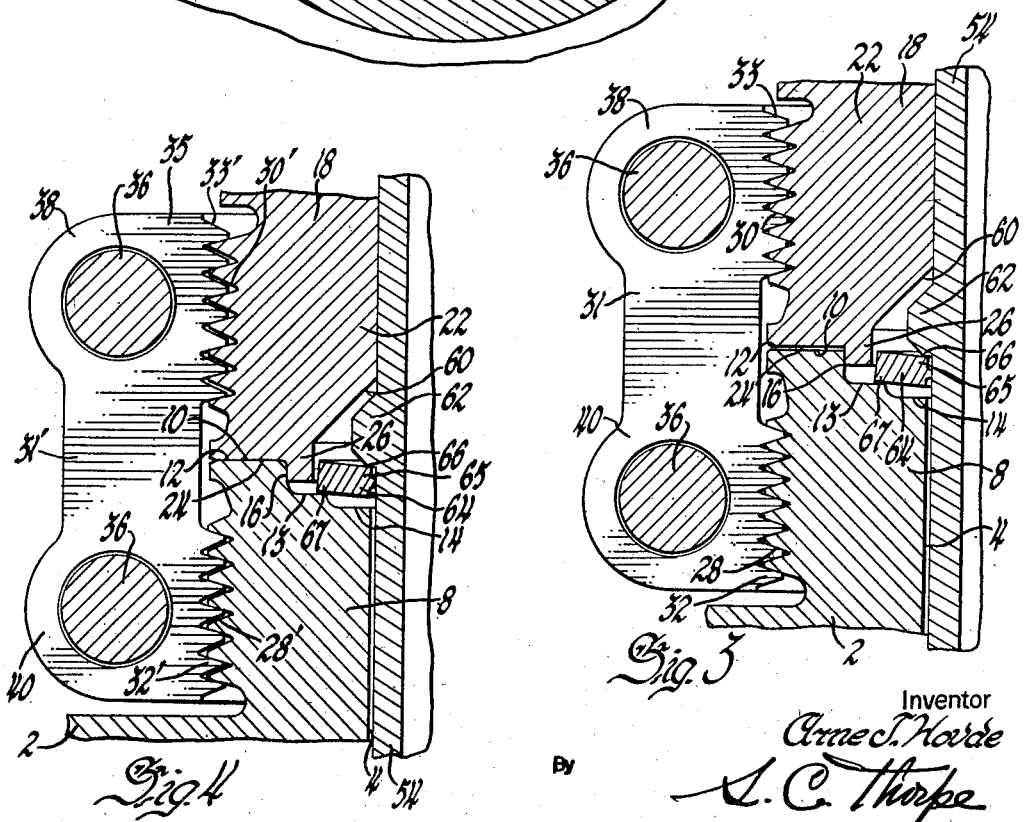
Inventor
Arne J. Hovde
By
S. C. Thorpe
Attorney United States Patent Office 2,818,055
Patented Dec. 31, 1957

2,818,055

INTERNAL COMBUSTION ENGINE

Arne J. Hovde, Rocky River, Ohio, assignor to General Motors Corporation, Detroit, Mich., a corporation of Delaware Application July 30, 1954, Serial No. 446,712

10 Claims. (Cl. 123—193)

This invention relates to a piston-type internal combustion engine and particularly to improvements therein with respect to the mounting of the cylinders to the crankcase.

In conventional engines of this type, particularly those of relatively large size, the cylinders are each provided at their lower ends with an external flange which mates with a cylinder mounting flange formed integrally with the crankcase. These flanges are generally secured together by a ring of bolts or studs or by peripheral clamping means which effect a wedging action on the flanges to draw the cylinder and crankcase together at their mating surfaces. However, such cylinder-to-crankcase mountings are subjected to severe impact loadings and subjected to temperature gradations resulting in unequal thermal expansion between the various members which stress the various members of the coupling unevenly and generally tend to loosen the connection. Where the stud and flange type construction is utilized, the cylinder-securing studs become very highly stressed elements due to the dynamic forces acting on the cylinder barrel and the crankcase, and the stresses in the cylinder flange and crankcase become concentrated around each stud and its mating nut. For these reasons, a large number of studs and nuts must be used for each cylinder, many of which are in relatively inaccessible positions between adjacent cylinder, and extreme care must be taken in obtaining as near uniform tightening of each stud and nut connection as possible. These factors add considerably to the cost of the engine, to the time required to install and remove the cylinders, and to the difficulty of maintaining each cylinder-to-crankcase mounting in a properly tightened condition.

Connections utilizing a peripheral clamp, generally of U-shaped split ring construction, to embrace the cylinder and crankcase flanges and to wedge their mating surfaces together are generally easier to maintain in tightened condition than the stud-type connection. Such connections also have the further advantage of providing a uniform stress distribution in the cylinder and crankcase flanges. However, the impact and thermal expansion factors mentioned above will in time tend to loosen the clamped connection with resultant objectionable galling between the limited mating surfaces of the clamping ring and of the mating cylinder and crankcase flange surfaces.

It is the principal object of this invention to avoid the foregoing limitations by providing an improved clamping ring connecton between a crankcase and a cylinder mounted thereon of simplified construction which is economical in weight and cost and which affords relatively uniform stress distribution. This object is attained by providing circumferentially serrated clamping surfaces on the cylinder and on an upstanding crankcase skirt portion forming a mating port, and coupling the cylinder and the crankcase skirt portion by means of a split clamping ring having inwardly facing groups of coacting serrations to take the clamping pressures on each.

The manner by which the foregoing and other objects of the invention are attained will be clear from the following description having reference to the drawings wherein:

Figure 2 is a sectional view taken substantially on the line 2—2 of Figure 1.

Figure 3 is an enlarged fragmentary view similar to Figure 1 showing the relation of the cylinder, the crankcase, and the clamping ring thereof in greater detail.

Figure 4 is an enlarged fragmentary view similar to Figure 3 but showing an alternative embodiment of the invention.

Figure 1:
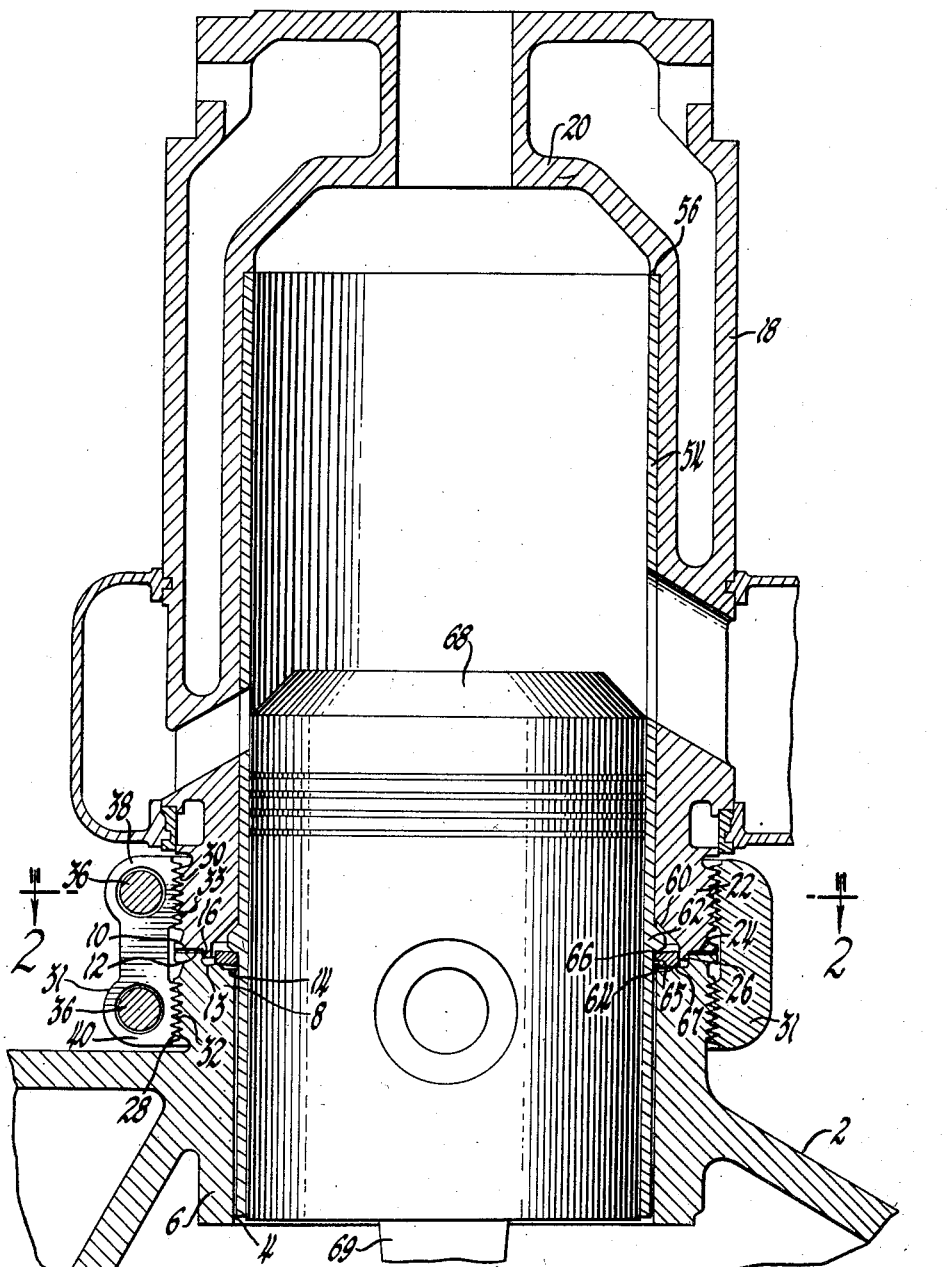
Figure 1 is a partial sectional view of an engine incorporating one form of the invention, the section being taken substantially diametrically on the engine cylinder with the piston and connecting rod associated with the cylinder being shown in elevation.

Referring now to the drawings and first to Figures 1 to 3 in particular, the engine crankcase is indicated generally by the numeral 2 and has formed therein a cylindrical port terminating inwardly and outwardly of the crankcase in annular tubular skirt portions 6 and 8. The upper or outer face 10 of the external skirt portion 8 is of stepped configuration having an upper annular surface portion 12 surrounding recessed lower surface portions 13 and 14; the surface portions 12 and 13 being joined by a vertical shoulder 16. It will be understood that the crankcase may be provided with additional similar cylinder ports 4, the number depending on the number of engine cylinders to be used. Connected to the crankcase 2 and in coaxial alignment with the cylinder port 4 is a cylinder barrel or housing 18 which terminates at its upper end with an integral cylinder head 20. The cylinder barrel is provided at its lower end 22 with a stepped annular bottom surface 24, the outer portion of which is in opposed relation with the surface portion 12 of the crankcase, and the inner and lower depending portion 26 pilots closely on the crankcase shoulder 16 and terminates in slightly spaced axial relation from the lower surface portion 13 of the crankcase.

The adjacent end portions of the crankcase skirt 8 and the lower end of the cylinder 22 are of substantially the same external diameter and each have a plurality of outwardly facing parallel serrations 28 and 30, respectively, formed circumferentially on the external surface thereof. The opposite faces of each serration form an included angle which is equally bisected by a plane passing through the crest thereof. These serrated end portions are encircled by a peripheral clamping means in the form of a split clamping ring 31 having spaced groups of inwardly facing serrations 32 and 33 which cooperatingly embrace the serrations 28 and 30, respectively. The ends 34 and 35 of the clamping ring 31 are provided with integral bosses 38 drilled to receive a pair of clamping bolts or studs 36. The opposing surfaces 40 of the bosses 38 have a designed minimum spacing between them to prevent their abutment when the bolts 36 are drawn up in assembling the cylinder to the crankcase. The groups of serrations 32 and 33 are so spaced that when the bolts 36 are tightened, the full cylinder-to-crankcase supporting load is carried by the clamping ring 31 and the serrations formed thereon; the end surfaces 12 and 24 of the crankcase skirt and the cylinder being maintained in axially spaced relation of each other as piloted by the shoulder 16 and the depending cylinder portion 26.

This connection, shown in Figures 1 and 3, provides a number of advantages over conventional cylinder-to-crankcase clamping ring connections. The shallower cooperating multiple serrations permit larger cross sectional areas of the lower end of the cylinder and of the crankcase skirt portion. The serrations provide greater stress or load distributing surfaces, and with the spaced axial relation between the end surfaces of the crankcase skirt and the cylinder, these clamping ring surfaces are not subject to thermal expansion stresses set up by the axial abutment of the end surfaces. Similarly, the spaced end surfaces are not subjected to thermal expansion and inertia impact stresses. Consequently, with this connection objectionable galling, which occurs between the various clamping and mating surfaces of conventional clamping ring connections and which tends to result in loosening of such connections, does not occur. It will also be noted that the use of such clamping means has a further advantage in that the compression ratio of the cylinder can be changed by merely varying the spaced relationship of the crankcase and cylinder surface portions 12 and 24 by varying the amount of cooperating engagement between the serrations 32 and 33 of the clamping ring 31 and the serrations 28 and 30 of the crankcase 2 and of the cylinder barrel 18, respectively.

In the modification shown in Figure 4, the spacing of the groups of serrations 32' and 33' on the clamping ring 31' and 28' and 30' on the crankcase skirt 8 and cylinder end portion 18 with respect to the mating surfaces 12 and 24 thereof is such that the drawing up of the bolts 36 effects a wedging action between the mating serrations of the ring member 31', the crankcase skirt portion, and the cylinder end portion. This wedging action is exerted in opposite directions to force the mating surfaces 12 and 24 of the crankcase and cylinder into tight engagement. The serrations utilized to provide this wedging action may have opposite face portions inclined at equal angles to a plane bisecting the crests thereof as in the form of the invention illustrated in Figures 1 to 3. However, in the modified wedging type form of the serrated clamp, as shown in Figure 4, those faces effecting the wedging action are disposed with a lesser angle of divergence from the specified plane than those faces which are not normally in load transmitting engagement. This construction of the serrations presents teeth having better internal stress distributing characteristics and providing a more gradual wedging action.

With either form of the invention, the clamping ring should be of such dimension so as to enable the ends of the ring member to be drawn together a sufficient distance during tightening to effect the desired cylinder-to-crankcase pressure without encountering interference or abutment between the bossed ends of the clamping ring and between the roots and crests of the coacting serrations. When applying such clamping pressures, the bolts 36 should be stressed to effect an axial elongation thereof capable through the elasticity of the bolts of supplying sufficient clamping pressure on said clamp under normal engine operating conditions of temperature and load. While the clamping ring 31 is illustrated in the drawings to comprise a single member, it is contemplated that segmental clamping rings may also be used for this purpose.

The invention has particular application to a construction such as shown in Figure 1, wherein a cylinder liner abuts at one end against the cylinder head and is supported adjacent its other end by a Belleville-type spring support mounted in a recess formed between the lower end of the cylinder and the crankcase. However, its use is not limited to engine constructions of this particular type and is considered adaptable to cylinder-to-crankcase mountings generally. As shown in Figure 1, the cylinder liner is indicated at 54 and has its upper end in abutment with the cylinder head portion 20 of the cylinder 18, there being a shoulder 56 provided for this purpose in the upper terminus of the cylinder portion proper. A gasket, not shown, of suitable material may serve to space the upper end of the liner from the shoulder 56. The inner wall and depending portion at the lower end of the cylinder is relieved as by the chamfer 60 to provide a clearance for an external flange or shoulder 62 on the liner 54 and a Belleville spring 64. The Belleville spring is made of spring steel or other hard resilient material and has a diameter loosely fitting the periphery of the liner 54 below the liner shoulder 62. Its inner marginal upper edge 65 abuts against the underside 66 of the liner flange 62 and its outer lower edge 67 rests on the recessed surface portion 14 of the crankcase 2. Thus when the clamping ring member 31 is installed and tightened, the cylinder 18 being drawn downwardly against the crankcase forces the liner firmly against the Belleville spring 64 which serves to resiliently suspend the liner and accommodates relative thermal expansion of the liner and cylinder during engine operation. Reciprocably slidable in the cylinder liner 54 is the usual piston 68 which is connected to the engine crankshaft, not shown, by the connecting rod 69.

From the foregoing description, it will be seen that the invention provides an improved clamping-ring connection between a crankcase and a cylinder thereon which provides maximum interlocking surface engagement between the various members. This connection affords a relatively uniform stress distribution within the various members and eliminates the need for clamping flanges on both the cylinder and crankcase members thereby providing a simplified and more compact construction which is economical in weight and cost and affords greater accessibility between the individual engine cylinders.

As many changes could be made in the above construction without departing from the scope of the invention, it is intended that all matter contained in the above description or shown in the accompanying drawings shall be interpreted as illustrative and not in a limiting sense. It is appreciated that various minor modifications may be made without departing from the spirit and scope of the invention as defined in the following claims.

I claim:

1. In an engine, the combination of a crankcase, a cylinder, said crankcase and said cylinder having adjacent coaxial tubular portions, said portions having axially spaced, radially extending end surfaces and each of said portions having a plurality of outwardly facing serrations formed circumferentially thereon, a split clamping ring encircling the tubular portions of the crankcase and the cylinder and adapted to be tightened thereon, said clamping ring having spaced groups of serrations formed thereon adapted to cooperatively and wedgeably embrace the serrations on said crankcase and cylinder portions thereby carrying the supporting load therebetween and means for resiliently tightening said clamping ring onto said tubular portions whereby said serrations are maintained in wedging engagement under all engine load and temperature conditions.

2. In an engine, the combination of a crankcase, a cylinder, said crankcase and said cylinder having mating tubular portions, said portions each having a plurality of circumferential serrations formed thereon, a split clamping ring adapted to be resiliently tightened on the tubular portions of the crankcase and cylinder, said clamping ring having spaced groups of serrations formed thereon cooperatively embracing and wedging the serrations on said crankcase and cylinder to force the mating end surfaces of said portions into tight engagement when said clamping ring is tightened, and means for resiliently tightening said clamping ring onto said tubular portions thereby maintaining said serrations in resilient wedging engagement under all engine load and temperature conditions.

3. In an engine, the combination of a crankcase having a port therein, said port comprising a cylinder-attaching skirt having a plurality of outwardly facing serrations formed circumferentially thereon, a cylinder housing having an end portion coaxial with said crankcase skirt, said end portion having outwardly facing serrations formed circumferentially thereof, and peripheral clamping means including a split clamping ring adapted to encircle the crankcase and cylinder housing and having spaced groups of inwardly facing serrations formed thereon cooperatively and wedgeably embracing the serrations on said crankcase and cylinder portions, and means for resiliently tightening said clamping ring onto said skirt and said end portion whereby said serrations are maintained in wedging engagement under all engine load and temperature conditions.

4. In a piston-type engine, the combination of a crankcase having a cylinder-mounting port formed therein, a cylinder housing, said crankcase adjacent said port and said cylinder housing having mating tubular portions, said portions each having a plurality of parallel V-shaped serrations formed circumferentially thereof, and peripheral clamping means encircling the crankcase and cylinder housing, said clamping means including a split resilient clamping ring and a resilient ring tightening means, said ring having spaced groups of parallel V-shaped serrations formed thereon adapted to cooperatively and wedgeably embrace the serrations on said crankcase and cylinder portions to force the mating surfaces of said portions into tight engagement, and said ring tightening means being adapted to resiliently tighten said ring on said portions thereby maintaining said serrations in resilient wedging engagement under all engine load and temperature conditions.

5. In a piston-type engine, the combination of a crankcase having a cylinder-attaching skirt portion formed thereon, a cylinder housing having an end portion in opposed axially spaced relation to said crankcase skirt portion, each of said portions having a plurality of parallel circumferential V-shaped serrations formed on the external surface thereof, and clamping means comprising a resilient clamping ring having a plurality of V-shaped serrations formed internally thereof adapted to cooperatively and wedgeably embrace the serrations on said spaced crankcase skirt and cylinder portions and carrying the supporting load therebetween, and means for resiliently tightening said clamping ring onto said portions whereby said serrations are maintained in wedging engagement under all engine load and temperature conditions.

6. In a joint for securing two coaxial cylindrical members together, the combination of a first cylindrical member, a second cylindrical member of substantially the same diameter as said first member, said members each having end surfaces of stepped configuration with vertical shoulder portions telescopically piloting said members in coaxial relation, each of said members having a plurality of outwardly facing parallel serrations formed circumferentially on the external surface adjacent the end portions thereof, and peripheral clamping means encircling the serrated end portions of the cylindrical members, said clamping means comprising a split clamping ring having axially spaced groups of inwardly facing serrations formed thereon cooperatively and wedgeably embracing the serrations on said cylindrical members, and means for resiliently tightening said clamping ring onto said tubular portions whereby said serrations are maintained in resiliently wedging engagement under all load and temperature conditions.

7. The combination as set forth in claim 6 in which each of the serrations are of V-configuration having oppositely disposed face portions inclined at equal angles to a radial plane, each of said face portions being maintained in load transmitting wedging engagement with the face portions of a coacting serration by the resilient tightening action applied to the clamping ring.

8. The combination as set forth in claim 7 and in which the groups of serrations formed internally of said clamping ring are axially spaced so as to maintain the radially extending end surfaces of each member in axially spaced relation to the opposing end surfaces of the other of said members.

9. The combination as set forth in claim 6 in which said serrations are of V-configuration, each of said serrations having an inclined side face normally effecting the load transmitting wedging action betwen said members, and each of said load transmitting faces being disposed at a lesser angle of divergence from a radially extending plane than the oppositely disposed face of the serration which is not normally in load transmitting engagement.

10. The combination as set forth in claim 4 in which said serrations have inclined side faces for effecting the load transmitting wedging engagement between said members, and said load transmitting side faces being disposed at a lesser angle relative to a radially extending plane than the oppositely disposed faces of the serrations which are not normally in load transmitting engagement.

References Cited in the file of this patent

UNITED STATES PATENTS

| 1,093,868 | Leighty | Apr. 21, 1914 |
| 2,412,344 | Ledwith | Dec. 10, 1946 |
| 2,674,988 | Evans et al. | Apr. 13, 1954 |

FOREIGN PATENTS

| 305,315 | Germany | Apr. 26, 1918 |
| 514,939 | Great Britain | Nov. 22, 1939 |